July 27, 1954   W. TRUNK   2,684,625
LOBSTER BROILER
Filed Nov. 12, 1952

INVENTOR.
William Trunk
BY
*Sam J. Slotoky*
ATTORNEY

Patented July 27, 1954

2,684,625

UNITED STATES PATENT OFFICE 2,684,625

LOBSTER BROILER

William Trunk, Sioux Falls, S. Dak.

Application November 12, 1952, Serial No. 320,044

4 Claims. (Cl. 99—441)

My invention relates to a lobster broiler.

An object of my invention is to provide a utensil for broiling lobster or lobster tails in a simple device.

A further object of my invention is to provide a device which will maintain the lobster or lobster tails in a flattened condition while broiling or baking, so that the resultant product will not curl up, but will remain in its flattened condition.

A further object of my invention is to provide a utensil in which the tail appendages and the like are prevented from burning.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1:
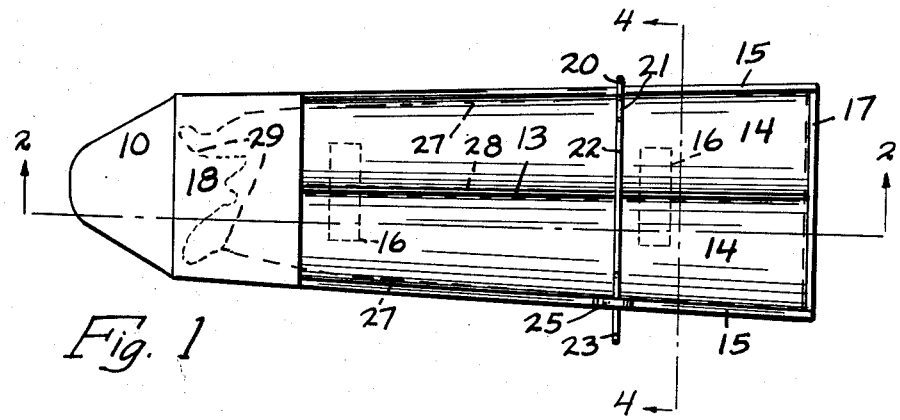
Figure 1 is a plan view of the lobster broiler.
Figure 2:
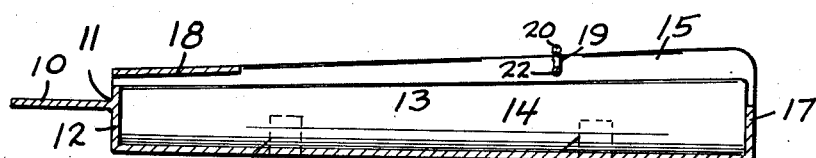
Figure 2 is a sectional view of Figure 1 taken along the lines 2—2 thereof.

My invention contemplates the provision of a simple and useful device wherein lobster tails or lobsters can be broiled, eliminating some of the objectionable features commonly present in the ordinary broiling methods, such objections being that the lobsters or lobster tails will curl up during the broiling operation, or the tail appendages and the like will become singed and burnt, the present invention eliminating the same, and also including other advantages.

I have used the character 10 to designate a substantially flat cast metal member which serves as the handle of the utensil, the member 10 merging at 11 with a wall 12, and merging with the wall 12 is a vertically positioned central rib 13, the rib 13 forming the sides of a pair of substantially semi-cylindrical portions 14, which portions 14 extend into the side walls 15, and cast integrally with the members 14 are the ribs 16 which provide flat surfaces to rigidify the structure and to provide a firm foundation when the device is resting upon a grill, etc.

The centrally positioned member 13 joins a transverse wall 17 at the other end of the device, the wall 17 merging with the portions 14 and 15.

Formed integrally with the upper portions of the side walls 15 is a flat substantially horizontal wall 18, and received through an opening 19 in one of the walls 15 is the looped portion 20 of a spring-like bar 21 having the depressed portion at 22, and the outwardly projecting portion at 23, this bar being adapted to be engaged within the slot 24 of the retaining member 25 which is formed integrally with the other wall 15.

The device is used in the following manner. In assuming that a lobster tail is to be broiled, the lobster tail is cut along the dotted line 26 as shown in Figure 5, the dotted line character 27 indicating a typical cross section of a lobster tail, or a lobster body. The lobster tail is cut to the point 26, but not through the shell, both half sections of the lobster tail then being bent into the approximate position shown in Figure 4, wherein they are then firmly pressed into the concave portions 14, the member 21 being in its disengaged position, the tail also being inserted in such a manner that the appendages at the end as indicated by the character 29 in Figure 1 will lie beneath the wall 18.

Figure 3:
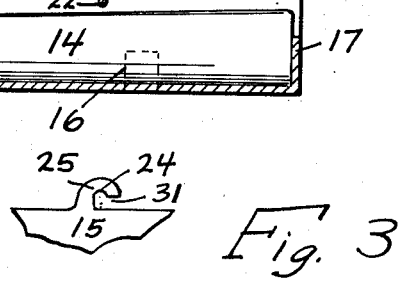
Figure 3 is a detail.
Figure 4:
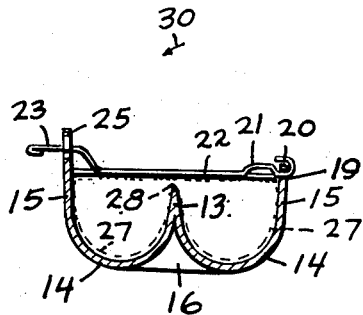
Figure 4 is a sectional view of Figure 1 taken along the lines 4—4 thereof.
Figure 5:
Figure 5 is a dotted view of a lobster section showing how the lobster is cut in the usual manner, and for broiling in the present device.

Next, the member 21 is swung around in the direction of the arrow 30 to the position shown in Figure 4, the spring-like material of which will allow the portion 23 to pass through the slot 31 of the member 25 (see Figure 3) and so that the portion 23 will then be tightly engaged within the slot 24. The bar portion 22 will thereby force the lobster sections downwardly into intimate engagement with the walls 14 and 15, so that during heating, the tail portion will be thoroughly and uniformly cooked. It will be noted further that by virtue of this construction, the tail portions are maintained in a practically horizontal or flat condition throughout the cooking process, so that when they are removed from the utensil, they will remain in this position and will not curl up, it being noted further that the portions 29 will be also protected from the flame or heat, preventing burning of these portions.

The handle 10 can be grasped in any desired manner by tongs or the like, and any number of the units can be used at one time if desired. Also, it should be specifically understood that larger units can be employed for the lobster body portions, which portions are merely continuations of the tail portions, so that the utensil can therefore be used for lobster tails or the lobster itself. The end walls 12 and 17 will maintain the lobster sections in their proper position during the cooking operation, the utensil being placed first in the broiler and then in the oven in the usual manner and as required. After the lobster is broiled to completion, the portion 23 of the member 21 is disengaged from the member 25, with the member 21 being swung out of the way, whereupon the lobster portions are removed for eating.

It will be noted that the central rib 13 will not extend to the same heighth as the side walls 15, in order to provide means wherein the lobster tail, or lobster sections can be placed beneath the plate 18. The bar 22 is not essential since the plate 18 will provide the function also of maintaining the lobster sections in a flat condition during the broiling operation. It will also be noted that the plate 18 is spaced slightly above the top of the wall 12 which will permit insertion of the tines of a fork in this space in case it is inconvenient to use the handle 10.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A lobster broiler comprising a pair of adjacently positioned substantially semi-cylindrical members for receiving lobster portions therein, a medially positioned rib forming the junction of said adjacently positioned members, a substantially horizontally positioned flat plate portion attached across said semi-cylindrical portions for providing means for maintaining lobster portions in said semi-cylindrical members in a substantially horizontal position during broiling thereof.

2. A lobster broiler comprising a pair of adjacently positioned substantially semi-cylindrical members for receiving lobster portions therein, a medially positioned rib forming the junction of said adjacently positioned members, a substantially horizontally positioned flat plate portion attached across said semi-cylindrical portions for providing means for maintaining lobster portions in said semi-cylindrical members in a substantially horizontal position during broiling thereof, said flat plate member being spaced slightly above the upper edge of said medially positioned rib.

3. A lobster broiler comprising a pair of adjacently positioned substantially semi-cylindrical members for receiving lobster portions therein, a medially positioned rib forming the junction of said adjacently positioned members, a substantially horizontally positioned flat plate portion attached across said semi-cylindrical portions for providing means for maintaining lobster portions in said semi-cylindrical members in a substantially horizontal position during broiling thereof, said flat plate member being spaced slightly above the upper edge of said medially positioned rib, said semi-cylindrical members including end walls, said flat plate member being spaced from one of said end walls to provide means for insertion of fork tines for supporting said broiler.

4. A lobster broiler comprising a pair of adjacently positioned substantially semi-cylindrical members for receiving lobster portions therein, a medially positioned rib forming the junction of said adjacently positioned members, a substantially horizontally positioned flat plate portion attached across said semi-cylindrical portions for providing means for maintaining lobster portions in said semi-cylindrical members in a substantially horizontal position during broiling thereof, said flat plate member being spaced slightly above the upper edge of said medially positioned rib, said semi-cylindrical members including end walls, said flat plate member being spaced from one of said end walls to provide means for insertion of fork tines for supporting said broiler, further retaining means spaced horizontally from said flat plate member for additionally securing said lobster portions.

References Cited in the file of this patent

UNITED STATES PATENTS

| Number | Name | Date |
| --- | --- | --- |
| 245,679 | Webster | Aug. 16, 1881 |
| 472,811 | Pickett et al. | Apr. 12, 1892 |
| 2,317,388 | Lako | Apr. 27, 1943 |

FOREIGN PATENTS

| Number | Country | Date |
| --- | --- | --- |
| 1,902 | Great Britain | Jan. 28, 1903 |